Oct. 29, 1963 R. J. HOLTON 3,108,666
FASTENING ASSEMBLY
Filed Nov. 17, 1959

INVENTOR.
ROBERT J. HOLTON
BY
Teare, Kramer, Sturges & Fetzer
ATTORNEYS

United States Patent Office 3,108,666
Patented Oct. 29, 1963

3,108,666
FASTENING ASSEMBLY
Robert J. Holton, Cleveland, Ohio, assignor to Tinnerman Products Inc., Cleveland, Ohio, a corporation of Ohio
Filed Nov. 17, 1959, Ser. No. 853,612
3 Claims. (Cl. 189—88)

This invention relates to a clip or fastener assembly for mounting molding, trim strips and similar objects on a supporting part, and more particularly relates to improvements in a clip or fastener assembly of the latter type which is adapted to be positively secured in a work opening in a supporting part by an operation taking place entirely from an outer accessible side of the supporting part, and which embodies a sealing element to effectively seal the work opening against the entry of water, dust, foreign matter and the like.

This application is related in general to the pending United States patent application of Robert J. Holton, Serial No. 830,529, filed July 30, 1959, and issued August 15, 1961, as Patent No. 2,995,789.

In the aforementioned pending application, there is disclosed a fastening assembly comprising a relatively small and inexpensive sheet metal clip providing a base or body and a pair of cooperating arms defining elements projecting from both the inner and outer surfaces of the base, with the outer elements serving the purpose of tab means for expanding the inner elements or shanks to anchored position in a work opening in the supporting part. Such assembly also includes a detachable type sealing element comprising a hollow head portion and a peripheral flange portion, such sealing element being adapted for assembly with the shank elements of the clip proper for mounting the sealing element in detachable interlocking relation with the clip proper. The assembly also includes an inexpensive auxiliary, sheet metal, trim strip attaching member comprising an apertured base portion and projecting flange portions, the latter being adapted for actually holding the molding or trim strip on a supporting part, thereby eliminating the necessity of storing a large number of sizes of clip proper for attaching various sizes of trim strip to the supporting part and resulting in a more expeditious and economical fastening assembly.

In the assembly of the aforementioned pending application, the base portion of the auxiliary fastening member is adapted for abutting relation with the outer or accessible side of the support panel, with the head portion of the sealing element extending through the aperture in the base portion of the auxiliary member and with a flange portion of the sealing element being disposed intermediate the outer surface of the base portion of the auxiliary member and the body of the clip proper. The head portion of the sealing element and the shank elements of the clip proper are then adapted to be fed through the work opening in the supporting panel, and upon actuation of the arms of the clip, the shank elements are deformed into holding engagement with the inner side of the supporting panel while at the same time deforming the head portion of the sealing element into sealing engagement with the work opening.

While the latter fastening assembly provides a suitable arrangement for most fastening requirements of the type described, if there are any irregularities on the outer or accessible surface of the supporting panel or on the inner surface of the base portion of the auxiliary member, a positive seal might not always be obtained, because such engaging surfaces of the supporting panel and the auxiliary member are relatively non-yielding. Such irregularities might occur during formation of the work opening in the supporting panel or formation of the aperture in the base portion of the auxiliary member, since such work openings and apertures are conventionally formed by drilling or punching operations, which might result in the formation of burrs or a roughness on the peripheral edges of such work openings and/or apertures, and unless the workman takes the time to remove such irregularities, as aforementioned a positive seal might not always be obtained.

Briefly, the present invention provides a fastening and sealing assembly comprising a bendable arm type clip of the general aforementioned type, a detachable sealing element of the general aforementioned type, and an auxiliary trim strip securing member of the general aforementioned type, but wherein the flange of the sealing element is adapted for abutting sealing engagement with the confronting surface of the supporting panel around the work opening therethrough, and with the base of the auxiliary trim strip securing member disposed intermediate the body portion of the clip proper and the flange of the sealing element. In other words, in the instant arrangement, the flange of the sealing element serves as a gasket between the outer surface of the panel and the under or inner surface of the auxiliary molding securing member, and in the event that there is any irregularity in either or both the surfaces of the supporting panel and the auxiliary member in the vicinity of the work opening and aperture respectively therethrough, the deformable flange portion of the sealing element compensates for such irregularities and always provides a positive sealing of the work opening. The base portion of the auxiliary member of the instant arrangement is also preferably of generally arcuate-like configuration for effectively holding the clip and sealing element assembly in generally tensioned relation on the supporting panel and for providing for effective mounting of the molding or trim strip on the panel.

Accordingly, it is an object of this invention to provide a fastening and sealing assembly for securing molding to a supporting part, such as a panel, wherein an inexpensive, auxiliary or secondary, apertured sheet metal, molding attaching member is provided which is assembled with a bendable arm clip proper and a detachable sealing element of the aforementioned types, and which auxiliary member actually performs the function of holding the molding to the supporting part, thereby providing an economical assembly without the necessity of stocking and utilizing large numbers of sizes of the clip proper for attaching various sizes of molding to a supporting part, and wherein effective sealing of the work opening in the panel will be accomplished irrespective of irregularities which may exist in the panel and/or in the auxiliary member in the vicinity of the work opening in the panel.

Other features and advantages of the invention will be apparent from the following description taken in conjunction with the accompanying drawings wherein.

Figure 1:
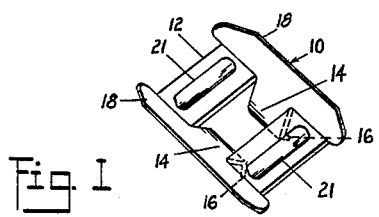
FIG. 1 is a persective view of a clip or fastener proper of the aforementioned bendable arm type adapted for use in the fastening and sealing assembly of the instant invention.

Referring again to the drawings, there is shown in FIG. 1 a bendable arm clip 10 of the general character which may be used in the instant fastening and sealing assembly, and as aforementioned is of a type known in the art. The clip 10 is an inexpensive article of manufacture of relatively small size which is readily constructed from any suitable malleable-like sheet metal such as cold rolled steel or malleable steel metal. Such malleable-like metal possesses the characteristic that it may be permanently deformed upon application of predetermined force as distinguished from a purely spring type metal which when bent will substantially return to its original position upon removal of the bending or distorting force. The clips may be formed from blanks of various outlines but from a quantity production standpoint are most advantageously provided from a comparatively small generally rectangular blank, which is readily obtained from standard sheet metal strip stock with little loss or waste of material.

The sheet metal blank or body defines the base 12 of the clip which is provided with a partially severed area, preferably in the approximate center thereof, forming a pair of bendable or movable arms 14 each comprising a tongue or shank portion 16 joined to a tab or head portion 18, the latter having a bendable or hinge connection to the base. The base 12 may be provided with indented embossments 21 for rigidifying the base.

Figure 2:
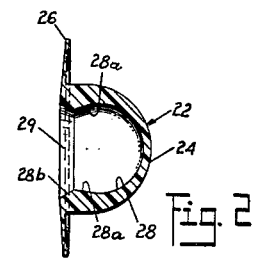
FIG. 2 is a vertical cross sectional view of a sealing element which is adapted for use in the fastening and sealing assembly of the invention.

The separable or detachable sealing element or plug 22 of the fastener assembly may comprise a head portion 24 of preferably dome-like exterior configuration and a base in the form of a peripheral flange or brim portion 26 which extends generally radially outwardly from the head portion. The sealing element is made from some pliable, resilient-like material, such as rubber, and may be economically mass produced. The head portion 24 defines a cavity 28 which is adapted to receive the shank portions 16 of the clip 10 therein. Referring in particular to FIG. 2, the inner surface of the plug element, which defines the open pocket 28 in the plug, generally converges as at 28a in a direction toward the brim portion 26, and then diverges generally outwardly as at 28b to form a relatively wider entranceway 29 into the cavity 28. Brim portion 26 is made of sufficient radial extension so as to materially overlap the confronting marginal portions of the work opening 30 in panel A, while the head portion 24 of the sealing plug is preferably of a size and configuration to be readily received in relatively close fitting, self-retaining relation in the work opening. The shank elements 16 of the clip may be disposed in interlocking relation with the oblique interior abutment surfaces 28a in the head of the sealing element to maintain the parts of the assembly in interlocked relation prior to mounting the assembly on the supporting panel as will be hereinafter described in detail.

The supporting part A is usually in the form of a plate or panel or the like, such as for instance the exterior side panels of an automotive vehicle, and is provided with a series of spaced work openings 30 therein for the required number of clip assemblies to be secured thereto along the path which the molding M (FIG. 8) is to extend when in mounted position. The panel A may be of any suitable generally rigid material such as metal, plastic or the like, and the openings 30 therein may be round, rectangular or of any other suitable outline but usually are provided in the manner of ordinary circular openings which involve the least cost inasmuch as only the simplest and cheapest punching or drilling tools are required.

Figure 3:
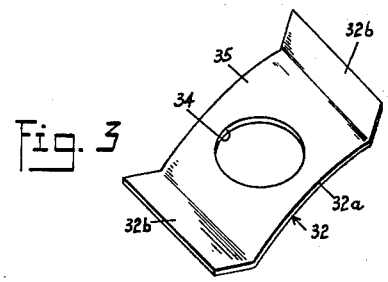
FIG. 3 is a reduced size perspective view of the auxiliary or secondary sheet metal clip member which actually performs the operation of holding the molding or trim strip to the supporting panel, and which is adapted for use in the fastening and sealing assembly of the invention.
Figure 4:
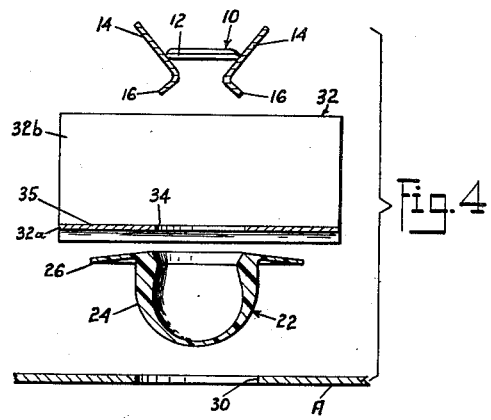
FIG. 4 is an exploded sectional view of the various components of the fastening and sealing assembly of the invention, together with the support panel and its work opening therein, as arranged for mounting on the supporting panel.

The auxiliary or secondary sheet metal member 32 (FIG. 3) is provided for the fastener assembly which member actually performs the function of holding the molding or trim strip on the supporting panel A. Member 32 comprises a generally arcuate base portion 32a and more or less resilient flange portions 32b projecting outwardly therefrom from opposite ends thereof. Base portion 32a comprises an opening 34 therethrough which in the embodiment of the invention illustrated has been shown as a circular opening. Opening 34 is adapted to receive therethrough the shank portions 16 of the clip proper 10 when in assembled relation therewith, and is small enough to prevent passage therethrough of the body 12 of the clip proper and of the head 24 and flange 26 of the sealing element.

Secondary member 32 is preferably constructed from relatively thin sheet metal the thickness of which is selected according to service requirements and the predetermined size of the molding or trim strip to be mounted or secured thereby. Such clip is most effective when provided of spring metal suitably tempered and otherwise treated to give the desired toughness and hardness. An inexpensive and highly satisfactory clip may be provided from cold rolled metal such as cold rolled steel which is untempered but of a spring metal nature and capable of providing a capable and reliable trim strip holding device in the fastener assembly described.

In accordance with the invention, the clip proper 10 is positioned over the outer side 35 of the base portion 32a of the auxiliary molding retaining member 32, and the shank portions 16 of the clip proper are passed through opening 34 in such base portion. The shank portions 16 are then fed through opening 29 in the sealing element into the cavity 28 thereof. During such movement of the shank portions into cavity 28, the outwardly flared portions 28b of the sealing element may coact in sliding relationship with the free ends of the shank portions of the arms of the clip proper and serve to cam the shank portions through the inwardly restricted entranceway 29 of the sealing plug and into cavity 28. During movement of the shank portions into cavity 28, the material of the sealing element may be deformed slightly or stretched so as to permit passage of the shank portions therein, but once the shank portions pass the ridge on the inner cavity surface of the sealing element, the elastic memory or resiliency of the material of the sealing element causes the latter to assume its normal substantially non-deformed shape, with the sealing element being held in positive assembled relation on the clip proper by the interlocking coaction between the shank portions 16 and the obliquely disposed abutment surfaces 28a on the inner surface of the cavity 28 and as shown in FIG. 5 of the drawings, thus holding the auxiliary molding attaching member 32 in assembled relation with the clip proper and the sealing element, with the base 32a of the auxiliary member being disposed intermediate the flange 26 of the sealing element and the body 12 of the clip proper.

Figure 5:
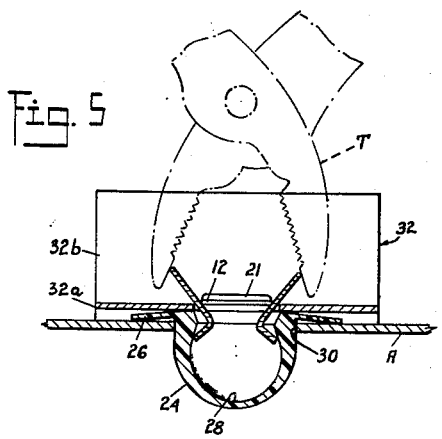
FIG. 5 is a sectional view showing the clip proper of FIG. 1, the auxiliary clip member of FIG. 3 and the sealing element of FIG. 2 as initially assembled in the work opening in the supporting part or panel, preparatory to securing the same in and over said work opening.

In mounting the securing and sealing assembly of the invention on the supporting part or panel A, an assembly as described above is positioned over or in front of a working opening 30 in the supporting panel, and then the head portion 24 of the sealing element 22 and associated shank portions 16 of the clip 10 are inserted through the work opening to substantially the position illustrated in FIG. 5 of the drawings. It will be seen that the flange portion of the sealing element is in direct contact with the marginal portions of the support panel surrounding the work opening therethrough, and in this position of the assembly, the tabs 18 of the clip proper are readily accessible from the upper or outer side of the panel. Upon actuation of the tabs 18, as by means of the tool T illustrated, the bendable arms 14 are bent around their connections to the base 12 of the clip proper to thereby cause the shank portions 16 to pivot in a manner whereby the shank portions are forced outwardly with respect to one another and overlap the adjacent edges of the work opening in the panel on the rearward or underside of the panel.

Figure 6:
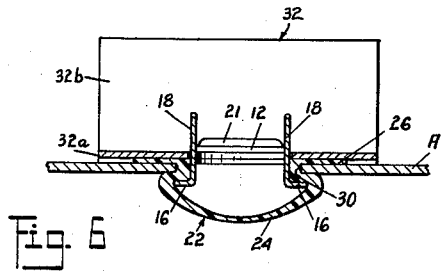
FIG. 6 is a view generally similar to FIG. 5 but showing the clip proper of FIG. 1 as actuated or bent to secure the assembly in sealing relation in and around the work opening.
Figure 7:
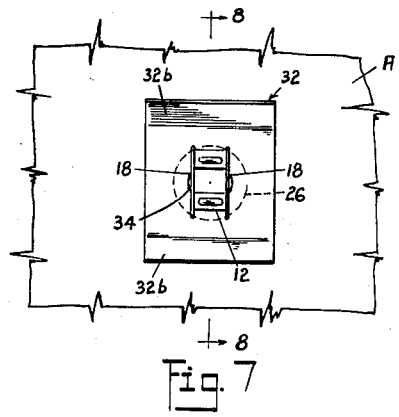
FIG. 7 is a reduced size top plan view of the secured assembly of FIG. 6.

During such movement of the shank portions 16, the head portion 24 of the sealing element is deformed or stretched in the direction of movement of the shank portions whereby portions of the defining wall of the head 24 of the sealing element are urged into overlapping relationship with marginal inner side edge portions of the panel A around the work opening 30. As the free ends of the shank portions 16 of the arms 14 deform and urge sections of the head portion 24 into generally coplanar relation with respect to the rearward or underside of the panel A, the arms may also draw the body 12 of the clip 10 toward the base portion 32a of the auxiliary clip member 32, thereby urging the latter against the flange portion 26 of the sealing element and effectively clamping such flange portion between the supporting panel and the base portion 32a of the auxiliary member and into positive sealing relation with the work opening in the panel irrespective of any irregularities that may exist adjacent the work opening in the support panel or adjacent the shank receiving opening 34 through the base portion of the auxiliary member. Since the flange portion is of pliable or deformable material it readily deforms and compensates for any such irregularities in either or both the auxiliary molding attaching member 32 and the support panel. It will be seen, therefore, that a positive sealing of the work opening in the supporting panel A occurs upon bending of the arm elements 14 to the general positions illustrated in FIG. 6 of the drawings, to thereby provide a positive seal against the entry of water, dust, etc. through the work opening. The tabs 18 of the clip proper 10 preferably extend lengthwise transverse to the lengthwise extension of flanges 32b of the secondary clip member 32, as can be best seen from FIGS. 5, 6, 7 and 8 of the drawings, to provide ready accessibility to the tabs by actuating tool T.

Figure 8:
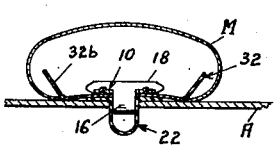
FIG. 8 is a sectional view taken substantially along the plane of line 8—8 of FIG. 7, looking in the direction of the arrows, and illustrating the trim strip or molding held in attached secured relation by the auxiliary or secondary clip member of FIG. 3 and as disposed in a complete fastener assembly.

In mounting the molding M on the panel A, as many fastener and sealing assemblies as are necessary are similarly secured in work openings prepared in such panel A and in generally aligned relation along the path in which the molding M is to extend in a completed assembly. The molding M which is of more or less resilient nature, well known in the art, is positioned over the secondary clip member 32 and is snapped into place and into interlocking relation with the resilient flanges 32b of the secondary clip member, and as is illustrated in FIG. 8 of the drawings, to attach the molding M to the support panel A. It will be noted that the arcuate configuration of the base portion 32a of the secondary member 32 insures contact of the secondary member 32 with the panel at the resilient flanged end portions 32b of the auxiliary member, thereby providing a positive abutment for the inner ends of the molding M and preventing their movement beneath the base portion 32a of the auxiliary member. The arcuate or bowed configuration of the base 32a of auxiliary member 32 also aids in maintaining the clip and sealing assembly in generally tensioned condition on the support panel and thus in optimum assembled relation therewith.

It will be seen that for various sizes or transverse widths of moldings, various sizes of auxiliary or secondary clip member 32 may be readily provided, the latter being of an economical and readily manufactured configuration, to thereby provide an effective yet economical fastening and sealing arrangement for the molding or trim strip.

It will also be seen that only one size of clip proper 10 is necessary in fastening assemblies utilizing various sizes of secondary clips 32, the latter being a much more economical item as compared to the clip proper, thereby eliminating the necessity of stocking and using a great plurality of sizes of the clip proper 10 for use with various sizes of molding.

If it becomes desirable or necessary to replace or repair the supporting panel A or the molding trim strip, as often occurs in the automotive environmental field, the molding M may be readily snapped out of interlocking relation with the flanges 32b on the secondary clip member 32, thereby exposing the tabs 18 of the bendable arms 14 of the clip proper 10 for bending away from one another, whereby the shank portions 16 are moved inwardly towards one another and out of interlocking relationship with the inner or underside of the supporting panel. The securing and sealing clip assembly can then be easily withdrawn from the work opening 30. It will be seen that in the latter event, all of the parts of the assembly may be reused again for remounting a molding on the support panel.

From the foregoing description and accompanying drawings it will be seen that the invention provides an improved and inexpensive fastener and sealing assembly for detachable mounting on a supporting panel for positively sealing a work opining in the supporting panel against the entry therethrough of water, dust, foreign matter and the like irrespective of irregularities that may exist in the vicinity of the work opening on the support panel or on the auxiliary molding attaching member, and an assembly which may be economically and expeditiously adapted for mounting various sizes of trim strip or molding on a supporting panel.

The terms and expressions which have been used are terms of description and not of limitation and there is no intention in the use of such terms and expressions of excluding any equivalents of the features shown and described or portions thereof, but it is recognized that various modifications are possible within the scope of the invention claimed.

I claim:

1. In a three-piece fastening assembly comprising a support part such as a panel having a work opening therethrough, a malleable-like sheet metal clip mounted over said work opening and comprising a generally planar body and a pair of spaced movable arms integrally connected to said body intermediate the ends of said arms and substantially in the plane of said body, said arms defining a pair of tabs projecting from one surface of said body and a pair of shank elements projecting from the opposite surface of said body, a generally U-shaped molding securing member formed from spring-like sheet metal and detachably mounted on said clip, said member comprising a base portion having an aperture of predetermined size therethrough, said base portion being of a symmetrical arcuate-like configuration in vertical cross-section for maintaining said clip in generally tensioned condition on the supporting part and for preventing movement of said molding relative to the supporting part, means on said base portion comprising resilient flanges extending divergently outwardly therefrom in the general direction of extension of said tabs for attaching the molding to the supporting part, said aperture receiving said shanks therethrough with one side of said base portion engaging said opposite surface of said body, and a deformable sealing element comprised of generally pliable material such as rubber, detachably mounted on said clip and retaining said member intermediate said body of said clip and said sealing element, said sealing element comprising a contiguous flange portion disposed intermediate the confronting side of said supporting part and the other side of said base portion, and a generally hollow dome-shaped, in exterior configuration, head portion projecting from said flange portion, said flange portion having an outer defining edge disposed in overlapping relation with the defining edge of said work opening and engaging marginal portions of said confronting side of said supporting part around said work opening, said head portion defining a cavity therein in which said shank elements are received to mount said sealing element on said clip with said head portion and associated shank elements of said clip extending through said work opening, the aperture in said base being of a substantially circular configuration and disposed adjacent the mid-portion of said molding securing member, and that portion of the base of said molding securing member surrounding said aperture engaging the confronting exterior surface of the dome-shaped head portion and said flange portion on a continuous 360° bearing and sealing area around said work opening, said shank elements being moved outwardly to generally permanently deformed positions and in secured relation in the work opening in response to inward movement of said tabs to generally permanently deformed positions, said shank portions upon movement thereof deforming said head portion in said work opening while drawing said body and base portion against the confronting exterior surface of the dome-shaped head portion and said flange portion on said continuous 360° bearing and sealing area to seal said work opening against the passage therethrough of foreign matter.

2. In a three-piece fastening assembly comprising a supporting part such as a panel having a circular work opening therethrough, a malleable-like sheet metal clip mounted over said work opening and comprising a generally planar body and a pair of spaced movable arms integrally connected to said body intermediate the ends of said arms and substantially in the plane of said body, said arms defining a pair of shanks projecting from one surface of said body and a pair of shank actuating tabs projecting from the opposite surface of said body, a sheet metal generally U-shaped molding securing member detachably mounted on said clip, said member comprising a base portion having an aperture of predetermined size therethrough, resilient planar flange means on opposite ends of said base portion extending divergingly outwardly therefrom in the general direction of extension of said tabs, said base portion being symmetrically bowed lengthwise in vertical cross-section thereof with the curvature extending in the general direction of projection of said flange means, said flange means being adapted for attachment of a molding to said supporting part, said aperture receiving said shanks therethrough with one side of said base portion engaging said one surface of said body, and a deformable sealing element comprised of pliable material such as rubber detachably mounted on said clip and retaining said member intermediate said body of said clip and said sealing element, said sealing element comprising a continuous flange portion disposed intermediate the confronting side of said supporting part and the other side of said base portion, said flange portion having an outer defining edge disposed in overlapping relation with the defining edge of said work opening and engaging marginal portions of said confronting side of said supporting part around said work opening, said head portion being of dome-shaped exterior configuration of a size complementry to the size of said work opening and defining a cavity therein which said shanks are received to mount said sealing element on said clip, said head portion and associated shanks extending through said work opening, the aperture in said base being of a substantially circular configuration and disposed adjacent the mid-portion of said molding securing member, and that portion of the base of said molding securing member surrounding said aperture engaging the confronting exterior surface of the dome-shaped head portion and said flange portion on a continuous 360° bearing and sealing area around said work opening, said shanks being moved outwardly to generally permanently deformed positions and in secured relation in said work opening responsive to inward movement of said tabs to generally permanently deformed positions, said shanks upon said movement thereof deforming said head portion while drawing said body and base portion in tensioned engagement against the confronting exterior surface of the dome-shaped head portion and said flange portion on said continuous 360° bearing and sealing area to seal said work opening and causing the flanged ends of said base portion to engage said confronting side of said supporting part outwardly of said flange portion of said sealing element.

3. In a fastening assembly in accordance with claim 2, including an arched resilient type molding mounted in detachable interlocking relation with said flange means on said supporting part.

References Cited in the file of this patent

UNITED STATES PATENTS

| | | |
|---|---|---|
| 2,306,460 | Meyer et al. | Dec. 29, 1942 |
| 2,924,864 | Holton | Feb. 16, 1960 |

FOREIGN PATENTS

| | | |
|---|---|---|
| 1,165,764 | France | June 2, 1958 |
| 218,270 | Australia | Oct. 30, 1958 |